Aug. 24, 1937. A. Y. DODGE ET AL Re. 20,478

BRAKE

Original Filed March 29, 1924 2 Sheets-Sheet 1

Inventors:
A. Y. Dodge
H. L. Pollard
By Jones, Addington, Ames & Seibold
Attys

BRAKE

Original Filed March 29, 1924 2 Sheets-Sheet 2

Inventors:
A. Y. Dodge
H. L. Pollard
By Jones, Addington, Ames & Selby
Attys.

UNITED STATES PATENT OFFICE 20,478

BRAKE

Adiel Y. Dodge, South Bend, Ind., and Willard L. Pollard, Chicago, Ill., assignors to Bendix Brake Company, Chicago, Ill., a corporation of Illinois Original No. 1,818,199, dated August 11, 1931, Serial No. 702,765, March 29, 1924. Application for reissue July 17, 1935, Serial No. 31,952

17 Claims. (Cl. 188—152)

Figure 1:
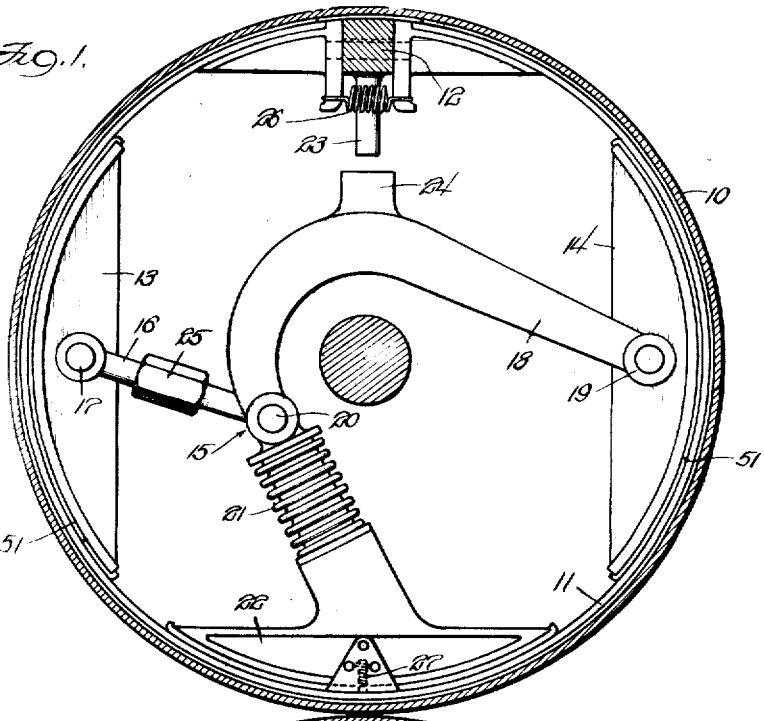

Our invention relates to brakes.

One of the objects of our invention is to provide an internal brake construction which will combine the advantages of the band brake and the shoe brake. A further object of our invention is to provide a brake which will be simple in construction and effective in use. Further objects will appear from the description and claims.

Figure 2:
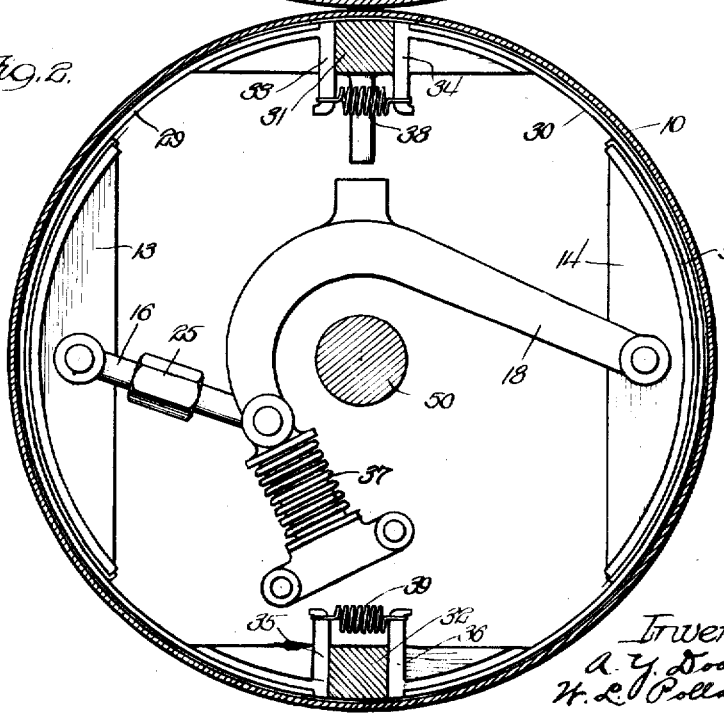
Figure 3:
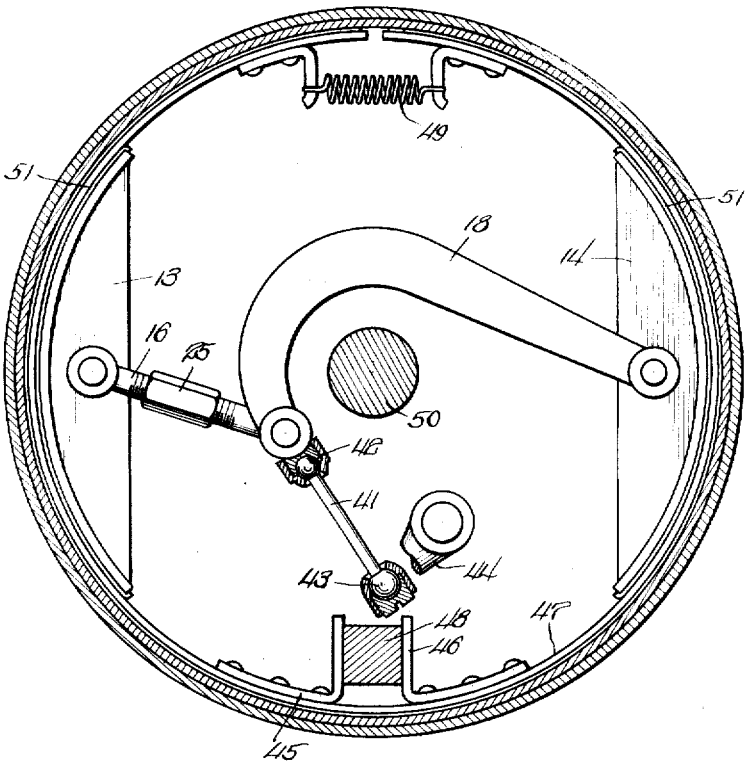

In the drawings in which several embodiments of our invention are shown:

Figure 1 is a side view of an internal brake construction; Fig. 2 is a side view showing a different form of brake; and Fig. 3 is a side view of still another form.

Referring now to Fig. 1, the construction shown therein comprises a brake drum 10, an internal flexible brake band 11 extending substantially clear around inside the drum, a fixed abutment 12, with which both ends of the brake band cooperate, a pair of diametrically opposite brake shoes 13 and 14, secured to the brake band 11, and means 15 for exerting radial pressure outwardly on the brake shoes 13 and 14.

The means for exerting radial pressure on the brake shoes comprises an adjustable link 16, pivotally connected at 17 with the brake shoe 13, a curved link 18 pivotally connected at 19 with the brake shoe 14, and pivotally connected at 20 with the adjustable link 16, and a hydraulic actuator 21, which may, if desired, be mounted on the brake band 11, and which is pivotally connected at 20 with the links 16 and 18.

The actuator 21 may be an expansible and compressible corrugated metal cell, mounted on a sort of shoe 22, secured to the brake band 11.

When a liquid is forced into the expansible cell, it expands, and acts on the toggle links 16 and 18, to force the brake shoes 13 and 14 outwardly.

In order to limit the movement of the toggle links to prevent them from moving past their dead center, a stop member 23 is provided on the abutment 12, which cooperates with the stop member 24 on the curved link 18. The link 16 is provided with a turn-buckle 25 for adjustment.

In order to release the brake when the pressure is released in the hydraulic actuator, springs 26 and 27 are provided, the spring 26 acting to draw the ends of the brake band together, and the spring 27 acting to raise the bottom of the brake band away from the brake drum.

The link 18 is curved so as to clear the stub-axle on which the wheel is mounted.

It will be seen that this brake is equally effective no matter in which direction the brake drum is rotated, and that it will be self-energizing practically throughout the entire circumference of the brake band.

The construction shown in Fig. 2 is substantially the same as that just described except that here the brake band is made in two parts, 29 and 30, each extending substantially 180 degrees. In this form, two abutments, 31 and 32, are provided, at diametrically opposite points, for holding the ends 33, 34, 35, and 36 of the brake bands against rotation with the drum.

In this form, the hydraulic actuator 37 is mounted in a suitable fixed support. Springs 38 and 39 are provided for releasing the brake bands when the pressure in the hydraulic actuator is released.

It will be seen that this form is equally effective no matter in which direction the brake drum is rotated, and that each part of the brake band will be self-energizing throughout substantially 180 degrees. In both forms, the extended brake shoe tends to give a more uniform pressure than would be obtained by the brake band alone.

The construction shown in Fig. 3 is substantially the same as that shown in Fig. 1 except that here abutment 48 acts on the middle portion of the brake band rather than on the end portions.

In this form the links 16 and 18 may be actuated by means of a link 41 having a ball and socket connection at 42 with the links 16 and 18, and having a ball and socket connection at 43 with the lock arm 44.

The lugs 45 and 46 are secured to the brake band 47 and located on opposite sides of the abutment 48. A spring 49 is provided for releasing the brake band when the hydraulic pressure is released.

In all of the forms shown, the link 18 is curved to provide clearance for the axle 50. Also in all of the forms, if desired, a cushion 51 may be provided between the shoe and the brake band to cause the brake shoe or segments to bear evenly on the brake band.

Having thus described our invention, what we claim as new and desire to secure by Letters Patent of the United States is:

1. An internal brake construction comprising a brake drum, flexible brake band means bearing on the inner surface of said brake drum, abutment means for holding said brake band means against movement under the action of the brake drum, and means for exerting radial pressure on diametrically opposite portions of said brake band means including a toggle linkage pivoted to opposite sides of the band.

2. An internal brake construction comprising a brake drum, flexible brake band means bearing on the inner surface of said brake drum, abutment means for holding said brake band means against movement under the action of the brake drum, and means for expanding said brake band means comprising a fluid pressure actuator mounted on one part of said brake band means and acting on a plurality or other parts of said brake band means movable independently of said one part.

3. An internal brake construction comprising a brake drum, brake band means bearing on the inner surface of said brake drum, means for holding said brake band means against movement under the action of the brake drum, and means for expanding said brake band means comprising a fluid pressure actuator mounted on one part of said brake band means, and a pair of links actuated by said actuator pivotally connected together and pivotally connected to other parts of said brake band means movable independently of said one part.

4. An internal brake construction comprising a brake drum, flexible brake band means bearing on the inner surface of said brake drum, abutment means for holding said brake band means against movement under the action of the brake drum, and means for expanding said brake band means comprising a fluid pressure actuator mounted on said brake band means, and a pair of links actuated by said actuator pivotally connected together and pivotally connected to said brake band means at diametrically opposite points.

5. An internal brake construction comprising a brake drum, flexible brake band means bearing on the inner surface of said brake drum, abutment means for holding said brake band means against movement under the action of the brake drum, an arcuate shoe bearing on said brake band means, and a cushion pad between said arcuate shoe and said brake band means to cause the arcuate shoe to bear evenly on the brake band.

6. A brake comprising, in combination, a drum, an expansible friction device within the drum, a fluid pressure actuator mounted on the central port of the friction device, and means operated by the actuator and engaging a plurality of spaced parts of said device spaced from and movable independently of said central part to expand it.

7. A brake comprising, in combination, a drum, an expansible friction device within the drum, an actuating device mounted on one part of the friction device, and a linkage operated thereby and acting on a plurality of separated other parts of the friction device, the pressure on the linkage and the reaction on the actuating device expanding the friction device at a plurality of separated points.

8. A brake comprising in combination a drum, a backing plate, an anchor on said backing plate, a friction device within the drum anchoring at one end of the friction device, directly on said anchor when the drum is turning in one direction and at the other end directly on said anchor when the drum is turning in the other direction, and fluid-power expanding means carried by and acting on said friction device.

9. A brake comprising, in combination, a drum, a backing plate, an anchor on said backing plate, a friction device within the drum anchoring at one end directly on said anchor when the drum is turning in one direction and at the other end directly on said anchor when the drum is turning in the other direction, and fluid-power expanding means acting on said friction device and shifting to permit said device to so anchor.

10. A brake having friction means and operating connections therefor comprising, in combination, toggle links acting on two parts of the friction means, a pivot connecting said links, and an operating device connected to said pivot and acting through the pivot and links on said parts of the friction means and also acting directly on a third and independently-movable part of the friction means.

11. A brake having friction means and operating connections therefor comprising, in combination, toggle links acting on two parts of the friction means, a pivot connecting said links, and an operating device connected to said pivot and acting with balanced pressures through the pivot and links on said parts of the friction means and acting by reaction directly on a third and independently-movable part of the friction means.

12. A brake comprising, in combination, a drum, friction means engageable with the drum and including at least three segments arranged end to end about the drum, operating connections between two of the segments, and applying means acting through the operating connections on said two segments and acting directly on the third segment.

13. A brake comprising, in combination, a drum, friction means engageable with the drum and including at least three segments arranged end to end about the drum, operating connections between the two end segments, and applying means acting through the operating connections on said end segments and acting directly on the intermediate segment.

14. A brake comprising, in combination, a drum, friction means engageable with the drum and including at least three segments arranged end to end about the drum, a pair of thrust links acting on two of the segments and forming a toggle, and an applying device having a brake-applying reaction on the third segment and acting in a toggle-straightening direction on said links.

15. A brake comprising, in combination, drum friction means engageable with the drum and including at least three segments arranged end to end about the drum, a pair of thrust links acting on two of the segments and connected by a pivot to form a toggle, and an applying device having a brake-applying reaction directly against the third segment and acting in a toggle-straightening direction on said pivot.

16. A brake comprising, in combination, a drum having a cylindrical flange, an expansible split floating band within the drum, a fixed abutment between the ends of the band, and fluid pressure operated mechanism arranged within said drum and engaging the center of said band to move it radially against the flange of the drum, said mechanism being also capable of limited movement circumferentially of the drum along with the band to allow either end of the band to anchor against said fixed abutment.

17. A brake comprising, in combination, a drum having a cylindrical flange, an expansible split floating band within said drum, a fixed abutment between the ends of said band, and fluid pressure operated mechanism supported within the drum and acting radially upon the inner surface of said band to force it outward and against the interior of said flange, said mechanism being movable along with the band to thereby permit either end of the band to anchor against said fixed abutment.

ADIEL Y. DODGE.
WILLARD L. POLLARD.

CERTIFICATE OF CORRECTION.

Reissue No. 20,478. August 24, 1937.

ADIEL Y. DODGE, ET AL.

It is hereby certified that error appears in the printed specification of the above numbered patent requiring correction as follows: Page 2, first column, line 60, claim 6, for the word "port" read part; and that the said Letters Patent should be read with this correction therein that the same may conform to the record of the case in the Patent Office.

Signed and sealed this 7th day of December, A. D. 1937.

(Seal)

Henry Van Arsdale,
Acting Commissioner of Patents.